United States Patent Office 2,756,127
Patented July 24, 1956

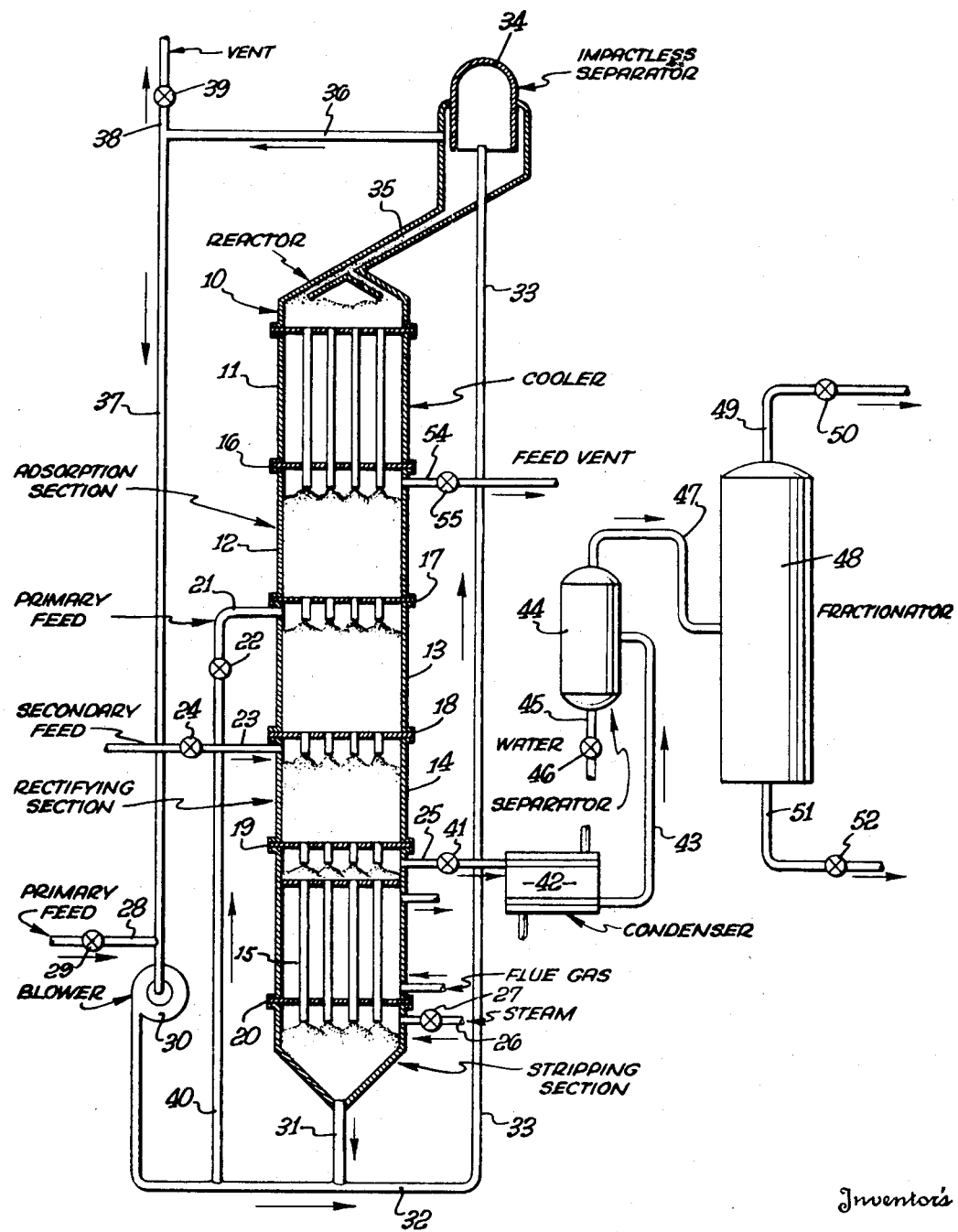

2,756,127

CHEMICAL OXIDATION PROCESS IN THE ADSORBED PHASE

Ivor J. James, Jr., Bellflower, and Art C. McKinnis, Long Beach, Calif., assignors to Union Oil Company of California, Los Angeles, Calif., a corporation of California Application June 30, 1952, Serial No. 296,442

21 Claims. (Cl. 23—157)

The present invention relates to a process for the chemical conversion of gaseous reactants in the presence of an adsorbent and particularly to pressure enhance oxidation reactions. The process is characterized by the fact that the chemical reaction between the gaseous reactants takes place in the adsorbed phase under unusually high pressures existing on the adsorbent while the system pressure as measured by gauges may be at or near atmospheric. This feature of the process materially simplifies the apparatus in which the reactions are effected. The adsorbent may or may not contain catalytic materials.

Some specific applications of this invention comprise a process for effecting the oxidation of organic compounds with oxidizing agents such as the oxidation of methanol to formaldehyde, the oxidation of ethylene with ozone to formaldehyde and hydrogen peroxide, the oxidation of ethylene with an oxygen-containing gas such as air to form ethylene oxide, the oxidation of hydrogen sulfide to sulfur, the oxidation and hydration of nitrogen dioxide ($2NO_2 \rightleftharpoons N_2O_4$) to nitric acid, the chlorination of hydrocarbons to form chlorinated products, etc. as well as the general processes represented by the above named specific reactions.

The present invention in its broader aspect comprises a process for effecting chemical reactions which are aided by the application of pressure or by the rapid removal of one of the products from the sphere of reaction or both, which process is characterized by the procurement of the desired pressure in a novel way as hereinafter more fully described. The foregoing statements are not intended to limit the present invention since it may readily be applied to other reactions, the rate of which is desirably affected by pressure.

It is an object of the present invention to provide a simple and efficient process whereby chemical reactions involving gaseous or vaporous reactants and which are facilitated by the application of pressure may be carried out in the presence of a solid adsorbent without the requirement of heavy equipment normally associated with high pressures.

A further object of this invention is to provide a process wherein adsorption pressures developed by the attraction of solid granular adsorbents for adsorbable gases are applied to the reaction of such gases with other constituents.

A specific object of this invention is to provide an improved oxidation process wherein the least readily adsorbable reactant of the process is first adsorbed on an adsorbent and then the more readily adsorbable reactant is brought into contact therewith and due to its higher molecular weight, boiling point or critical temperature, the latter reactant is preferentially adsorbed by the adsorbent and tends to displace the first reactant therefrom thereby bringing the reactants together in the adsorbed phase on the adsorbent under the very high adsorbed phase pressure.

Another object of this invention is to provide an improved process whereby olefin oxide may be prepared from the oxidation of olefins, aldehydes may be prepared by the oxidation of alcohols or by the ozonization of olefins, nitric acid may be prepared by the continuous oxidative hydration of nitrogen dioxide and oxidation of nitric oxide, sulfur may be prepared by the continuous oxidation of hydrogen sulfide by sulfur dioxide, and other oxidative chemical conversion reactions in which the rate of combination or reaction of gaseous reactant is facilitated by the application of pressure.

A further object of this invention is to provide a process whereby the foregoing reactions are carried out under a pressure generated by the attraction of the adsorbent for the gaseous reactants without the necessity of compressing the reactant to a superatmospheric reaction pressure.

Other objects and advantages of this invention will become apparent to those skilled in the art as the description thereof proceeds.

Briefly, the present invention resides in the utilization of the tremendously high adsorption pressures exhibited by certain forms of activated charcoal and other highly active adsorbents as a substitute for the induced pressure necessary in chemical conversions. It is well known that certain forms of activated charcoal and other adsorbents show exceedingly high adsorption capacity for gases and vapors. This capacity is doubtless a function of the large surface area of such charcoal, approaching in some cases as much as 800 square meters per gram. The significance of this surface area in resultant adsorption capacity may be emphasized by comparison with that of the higher grades of activated alumina which may range from about 200 to about 300 square meters per gram. We have developed a method of operation of an oxidation process wherein this high adsorption capacity and induced pressures may be utilized effectively thus eliminating the necessity of the use of exceedingly high operation pressures.

For the process of this invention it is essential that a charcoal be employed which possesses a comparatively high mechanical strength sufficient to resist excessive abrasion in a moving bed operation. For this purpose the various shell or hull charcoals such as coconut charcoal, apricot pit charcoal, and similar charcoals are decidedly superior to the animal charcoal such as bone charcoal and blood charcoal which exhibit very little if any mechanical strength. These hull or pit charcoals may be activated in any desired manner such as heating from about 500° C. to about 1000° C. in the presence of steam, carbon dioxide, air or other oxidizing agents whereby the oxygen and hydrogen containing impurities in the charcoal are removed leaving essentially the pure carbon structure. These charcoals are employed in the process of this invention in the form of small granules such as from about 2 to 40 mesh or preferably from about 10 to 20 mesh and of the above types the steam activated coconut hull charcoal is preferred.

In many reactions which may be carried out employing the principles of this invention, the charcoal adsorbent itself is sufficient to exert pressure necessary by adsorption of the reactants to desirably effect the reaction. It is entirely within the scope of the present invention to employ a catalyst impregnated on the adsorbent to increase the rate of reaction in the desired direction.

The adsorbent such as activated charcoal may be impregnated with one or more catalytic agents in any desired manner with the only restriction being that the impregnation be carried on in such a way that the adsorptive capacity of the adsorbent is not materially decreased. Thus if the desired catalytic agent to be employed is phosphoric acid, it is preferable to impregnate with a dilute solution of the acid to avoid plugging of the interstices of the charcoal. Similar care is necessary if the impregnation of a metal salt is desired inasmuch as the use of an excessively concentrated impregnating solution will not only result in a final composition containing a higher proportion of catalytic agent than is necessary, but will also tend to block a high percentage of the pore openings in the charcoal thus reducing its adsorptive capacity to inoperable levels. Subsequent to the impregnation the charcoal, upon which is distended a catalytic agent or a convertible form of the catalytic agent, is dried to give the final catalyst.

The essential elements of the process in the oxidation embodiment of this invention comprise the adsorption of the less readily adsorbable reactant on the adsorbent such as charcoal which may contain a catalyst, the subsequent reaction of this less readily adsorbable reactant by contacting the adsorbent with the more readily adsorbable reactant, stripping of the preferentially adsorbed product from the carbon catalyst with steam and/or indirect heating, and finally the separation of the reaction product from the mixture desorbed from the adsorbent. Thus, for example, in the oxidation and hydration of nitrogen dioxide ($2NO_2 \rightleftharpoons N_2O_4$) the nitrogen dioxide is adsorbed on the charcoal in the first step of the operation and in the adsorbed state is under a pressure within the charcoal which has been shown to range as high as 500 atmospheres. It should be emphasized that this pressure is solely the effect of the attraction of the reactant by the charcoal and is in no way brought about by an induced pressure in the reactant feed stream. Thus, advantage may be taken of these extremely high pressures to bring about the oxidative hydration reaction without the necessity of employing a high pressure system or high pressure feed stream. In this example the charcoal containing the adsorbed nitrogen dioxide under these tremendous pressures is subsequently contacted with steam which, due to its higher critical temperature, is preferentially adsorbed by the charcoal tending to displace the nitrogen oxide from the catalyst. In this process of displacement we have found that reaction takes place, if operated at correct temperatures, due presumably to the existence at some time within the catalyst of both nitrogen dioxide and steam phases under these very high pressures. The charcoal is maintained throughout this process at a temperature sufficient not only to effect the reaction but to prevent a condensation of the desorbed products or of stripping steam in the reaction system. Thus the minimum temperature of operation is governed by the boiling point of the particular reactant employed or the steam, whereas the upper limits are governed only by feasibility of operation, such temperatures as 600° F. to 700° F. being satisfactory although those temperatures decrease the amount of reactant adsorbed by the catalyst. The product which is formed in this reaction is, because of its relatively high molecular weight or higher critical temperature, preferentially adsorbed by the charcoal and passed therewith out of the reaction zone.

The charcoal adsorbent is subsequently heated to a higher temperature and stripped with small quantities of steam which has the effect of displacing the product from the carbon and leaving an essentially dry charcoal catalyst because of the higher temperatures of this secondary stripping operation. The product-steam mixture is withdrawn from this stripping zone and may be readily resolved into its components by simple phase separation when immiscible. It is important to examine this process with regard to the critical temperatures of the various reactants which may be employed in the reaction. Thus the critical temperature of nitrogen dioxide is 158.0° C. and at any higher temperature of operation it will therefore be in the vapor phase even under tremendously high pressures exerted by the charcoal catalyst. Also at temperatures above about 374.0° C. steam, which is the more readily adsorbable of the two, will exist only in the vapor phase. Thus, if the reaction is carried out at temperatures below about 158.0° C., the reaction will be entirely in the liquid phase on the adsorbent although the reactants enter at low pressure in the vapor phase.

It is to be understood that this invention is not limited to either liquid or vapor phase reaction but may be carried on under such conditions of temperature that either or both phases may be present in the catalyst.

The elements of this invention may be more readily understood by reference to the accompanying process diagram showing in general the mode of operation using charcoal as the adsorbent, but this is in no way intended to limit this invention in this particular. In the drawing, reactor 10 is divided into several sections; namely, charcoal cooler 11, adsorption section 12, reaction section 13, rectifying section 14, and the fired heater stripping section 15. These sections are separated from each other as far as gas flow is concerned by engagers 17 and 18 and by disengagers 16 and 19 which may be any conventional type of structure such as a tube sheet with short nipples as indicated in the diagram. The fired heater tubes in stripping section 15 are separated from the point of steam inlet by disengager 20. The less readily adsorbable or first reactant is introduced at engager 17 by means of line 21 controlled by valve 22 between adsorption section 12 and reaction section 13. The first reactant may be preheated to a temperature to correspond to a temperature of the downwardly flowing charcoal as it enters the upper portion of adsorption section 12. The first reactant passes upwardly in adsorption section 12 being adsorbed therein by the downwardly flowing charcoal inducing a temperature rise in the adsorption zone as the result of the exothermic nature of the adsorption phenomenon. Any less readily adsorbable constituents may be removed through vent line 54 controlled by valve 55.

The first reactant rich charcoal passes downwardly through engager 17 into the reaction section 13 where it is contacted countercurrently with the more readily adsorbable or second reactant introduced at engager 18 by means of line 23 controlled by valve 24. The second reactant coming in contact with the first reactant rich charcoal in the reaction section 13 has the effect as above described of tending to displace the first reactant from the charcoal and at the same time effecting the reaction of a certain proportion thereof with the second reactant. The displaced unreacted first reactant thereby migrates upwardly in the column until it comes in contact with and is readsorbed by the unsaturated charcoal, the reaction product being preferentially adsorbed on the charcoal passes downwardly with the charcoal through engager 18 into the rectifying section 14. The rectifying section has the effect of preferentially desorbing traces of unreacted reactant from the product saturated adsorbent so that the adsorbent leaving rectifying section 14 is substantially free from reactants.

The second reactant entering reaction section 13 which is not utilized in the reaction or is not adsorbed by the adsorbent tends to rise in reaction section 13 and the height of the second reactant migration in this section is controlled by the rate of introduction thereof through 23. A control point may be established within the reaction section operating on the basis of the temperature rise in the section due to heat of reaction or heat of adsorption which may be used to control the rate of second reactant entry by means of line 23 and thereby control the second reactant level in the reaction section. Also the height of product reflux migration up into rectification section 14 may be maintained by the measured temperature of the adsorbent therein and the step of controlling the rate of product removal through line 25. Temperature recorder controller instruments may be employed to operate valves 24 and 41 automatically.

The adsorbent passing from rectifying section 14 through disengager 19 into fired heater stripper 15 will contain the preferentially adsorbed reaction product which is stripped from the adsorbent by means of indirect heating and/or steam introduced into the stripping section by means of line 26 controlled by valve 27 (unless steam has a detrimental effect on the reaction product as where ethylene oxide is produced). The adsorbent is maintained in the section at a temperature at which substantially all of the steam will also be desorbed, the steam and product passing upwardly to disengaging section 19 where it is withdrawn as above described and in controlled quantities by means of line 25. Any product which may pass upwardly through section 19 into the rectifying section 14 as reflux will be immediately adsorbed by the downwardly flowing catalyst desorbing unreacted reactants and will be returned thereby to the stripping zone.

The adsorbent discharged from the stripper 15 is at a sufficient temperature so that it is substantially dry, containing only very minor amounts of water in vapor or liquid form. This charcoal adsorbent is then returned to the top of reactor 10 to complete the continuous cycle. The method of conveying the charcoal to the top of the reactor may involve gas lift or mechanical lift in any of their various modifications. In the drawing a gas lift method is shown whereby the first reactant feed is introduced by means of blower 30 via line 28 controlled by valve 29 picking up the charcoal from sealing leg 31 as it is forced through line 32 and passing up line 33 into the impactless separator 34. This separator operates on the principle of the decreased velocity of the gas stream upon increasing the effective diameter of the stream. Thus the diameter of impactless separator 34 is considerably larger than the diameter of line 33 whereby the charcoal readily drops out of the gas stream and flows from the separator down transfer line 35 into the top of reactor 10. The first reactant feed flows from the top of separator 34 via lines 36 and 37 back to blower 30 and subsequently into line 32. The recycle gas system is furnished with a vent means via line 38 controlled by valve 39. In this manner of operation the first reactant feed introduced into reactor 10 at engager 17 by means of line 21 is obtained as a side stream from the gas lift blower by means of line 40. Gases other than the feed may be used in the gas lift, but a partial contamination of the charcoal catalyst will result inasmuch as in the manner described we have found that the charcoal passing through line 35 from the impactless separator 34 is partially saturated with the feed. The steam-reaction product mixture withdrawn from stripping section 15 by means of line 25 controlled by valve 41 is passed through condenser 42 via line 43 into separator 44. In separator 44 a phase separation may take place between the products and water, the water phase being withdrawn from the bottom of the separator by means of line 45 controlled by valve 46 and is passed to waste.

The upper or immiscible phase, if any, is withdrawn from the top of separator 44 or the whole cool product is passed via line 47 into fractionator 48. In the fractionator any residual unreacted reactants or undesired by-products are distilled from the reaction product and are taken overhead by means of line 49 controlled by valve 50 or the product fractionated into desired products. The stabilized product is withdrawn from the bottom of fractionator 48 by means of line 51 controlled by valve 52. In some cases the product would be separated overhead from heavier undesired products.

Many modifications may be made in the reaction system without departing from the principles of this invention. Thus the primary reactant feed may be in excess of that adsorbed by the catalyst in order to insure complete saturation thereof. For this purpose a feed vent is provided at the top of the adsorption section represented in the drawing by line 54 controlled by valve 55. Further, in place of the gas lift adsorbent circulation system a mechanical lift means may be employed. Other modifications may also be made in the apparatus and in the mode of operation in which the primary element of this invention is utilized.

The temperatures within the reactor are controlled in regard to different factors; namely, the optimum temperatures of the particular reaction and the prevention of the actual condensation of any steam or reactant on the external surface of the charcoal catalyst. Thus, for example, in oxidation of hydrocarbons the temperature of the catalyst leaving charcoal cooler 11 may be maintained at about 150° F. or higher and as a result of the exothermic heat of adsorption the temperature of the first reactant rich charcoal passing through engager 17 from adsorption section 12 will be in the range of about 150° F. to 200° F. or higher. A further temperature rise will occur in reaction section 13 and the temperature of the adsorbent containing the adsorbed reaction products passing into the rectifying section 14 will be in the range of about 200° F. to 230° F. In the stripper 15 the temperature of the charcoal is raised to about 400° F. or higher to insure substantially complete removal therefrom of reaction products and steam. In the course of transferring the charcoal from the bottom of reactor 10 to the top thereof some cooling will take place and the charcoal will be further cooled in cooler 11 to the desired temperature of introduction into adsorption section 12. It is to be understood that these temperatures exemplify only one means of operation and a wide variation may be employed providing the two above stipulations are observed.

Depending upon the temperatures of operation and upon the adsorbent employed, minor amounts of polymerization may accompany the oxidation reactions tending to reduce the adsorption capacity of the adsorbent in which case it has been found necessary to install a small charcoal treater involving simply the high temperature steam treatment of the charcoal to remove the polymerization products prior to reintroduction in the reactor cycle.

Another interesting aspect of the present invention is the possibility of selective reaction of a particular more readily adsorbable reactant in a mixed first reactant feed. Inasmuch as the charcoal or other adsorbents exhibit a preferential adsorption increasing with an increase in the molecular weight or critical temperature of the reactant, it is possible by means of the process of this invention to introduce into the reactor a mixed first reactant feed such as an ethylene-propylene feed, selectively adsorbing the propylene from the mixture thereby carrying only the propylene down through the reactor, the ethylene passing upwardly in the adsorption section to disengager section 16 where it may be withdrawn by means of the olefin recycle line 54. Thus in the one operation we may effect a separation of two olefins and a selective oxidation of one to produce propylene oxide for example.

It is also within the scope of the present invention to employ the processes herein described for the reaction of acetylenes realizing thereby the big advantage that the acetylenes are under pressure only in a cellular type body thereby eliminating the danger from explosions brought about by chain reactions of acetylenes under pressure.

The following examples illustrate the application of the chemical oxidation process of the present invention to carrying out other diverse oxidation reactions in which the superatmospheric pressure, generated by the attraction of the adsorbent for the gaseous or vaporous reactants, is employed to facilitate the desired reaction. In each case the first reactant or primary feed is less readily adsorbable than the second reactant or secondary feed.

Example I

The oxidation of ethylene with ozonized air to form formaldehyde and hydrogen peroxide is carried out as follows:

Ozonized air containing about 2 to 3 volume per cent of ozone is employed as the primary feed and a gas containing ethylene is employed as the secondary feed. The temperature of the adsorbent is adjusted to about 210° F. Under these conditions the yield of formaldehyde is substantially quantitative based on the amount of ozone in the primary feed. The adsorbed formaldehyde is stripped from the adsorbent in the heater as above described in the presence of stripping steam and concentrated in fractionator 48 shown in the drawing.

Example II

The preparation of ethylene oxide may be carried out in the reactor of this invention by employing a charcoal adsorbent impregnated with a silver catalyst. The temperature of the charcoal is preferably maintained at about 300° F. to 400° F. adjacent the points where the primary and secondary feeds are introduced. The primary feed consists of a gas containing oxygen such as air, oxygen enriched air, or flue gas containing excess air, and the like. A gas containing ethylene is employed as the secondary feed. The ethylene oxide thus produced is more readily adsorbable than either the primary or secondary feed and is carried into the desorption or heating zone with the charcoal. Desorption of the adsorbed ethylene oxide may be carried out with steam if the desired product is ethyl alcohol. However, for the recovery of ethylene oxide as such, the desorption must be carried out in the absence of steam such as by mild heating alone or by preferential desorption using a more readily adsorbable vapor such as butane or pentane from which it is readily separable.

Example III

The oxidation of methanol to form formaldehyde may be carried out with particular advantage according to the methods of this invention. The extremely high pressures existing in the adsorbed phase on the adsorbent in which the reactions take place strongly inhibit the decomposition of formaldehyde to carbon monoxide and hydrogen. The primary feed is oxygen, the secondary feed is methanol vapor. Preferably the adsorbent contains an oxidation catalyst such as metallic copper, vanadium oxide or the like impregnated thereon. The temperature of the reaction in sections adjacent to the primary and secondary feed inlets is preferably maintained below 575° F. and preferably less than about 300° F. The formaldehyde product is recovered from the adsorbent by indirect heating and steam stripping and subsequently concentrated by fractionation or other means. The gases may be introduced at pressures of about atmospheric or somewhat higher, if desired.

Example IV

The hydration of nitrogen dioxide ($2NO_2 \rightleftharpoons N_2O_4$) is also a reaction which is favorably effected according to the method of this invention. A gas containing nitrogen dioxide is employed as the primary feed. The nitrogen dioxide (nitrogen valence 4) is adsorbed and carried downwardly through the reactor with the adsorbent to the hydration zone above the heating zone and the unadsorbed gas is removed from the adsorption zone. The adsorbent contacts stripping and hydration steam introduced below the heating zone as the secondary feed and the hydration and oxidation reaction takes place above about 230° F. in what is noted on the drawing as section 14 with the formation of nitric acid (nitrogen valence 5) which is adsorbed and the liberation of nitric oxide (NO) which is unadsorbed. The nitric acid is more readily adsorbed and is subsequently liberated from the adsorbent in the heating zone by indirect heat and stripping steam. The mixture of nitric acid and steam is concentrated in the fractionator shown. The nitric oxide liberated in the reaction passes into section 13 wherein it is combined with the secondary feed which consists of a gas containing oxygen such as air or other gas. The nitric oxide is readily oxidized in the gas phase to nitrogen dioxide in section 13 which is adsorbed and returns to the lower part of the reactor with a moving bed of adsorbent to be oxidized and hydrated. Gases other than oxygen introduced with the secondary feed pass out of the adsorption section with unadsorbed gases of the primary feed. Herein sections 12, 13, and 14 comprise adsorption, nitric oxide oxidation, and nitrogen dioxide oxidation-hydration zones, respectively. Especially efficient conversions to nitric acid have been possible in this process.

Example V

The production of sulfur from hydrogen sulfide and sulfur dioxide is readily carried out according to the methods of this invention by employing hydrogen sulfide as the primary feed and sulfur dioxide as the secondary feed. The adsorbent temperature is preferably maintained between the limits of 200° F. and 600° F. adjacent the points of feed inlet in the absence of a catalyst. Finely divided sulfur is formed in the adsorbent which is subsequently removed therefrom by means of indirect heating and stripping or by extraction. The feed gases are preferably introduced at atmospheric pressure and lower temperatures in the range given above and longer contact times are preferred.

Example VI

The chlorination of hydrocarbons, such as for example ethane, may be carried out at temperatures in the range of from 250° F. to 800° F. in the absence of a catalyst to form chlorinated hydrocarbons. A hydrocarbon such as ethane is employed as the primary feed to saturate the downwardly moving adsorbent and a halogen such as fluorine, chlorine, or bromine is introduced as the secondary feed. The halogenated hydrocarbon product is desorbed from the adsorbent in the stripping zone and recovered by distillation or other known means. The hydrogen chloride is separated from the reaction. Preferably a deficiency of halogen is employed to effect an economic conversion thereof to the desired product. Saturated or unsaturated hydrocarbons may be employed as the primary feed. The halogens are recognized as oxidizing agents and behave very similarly to oxygen in these reactions.

The above examples have been cited to illustrate the application of the principles of the process of this invention to carrying out of chemical oxidation reactions which are beneficially effected by an increase in pressure or by the rapid and efficient removal of readily adsorbable reaction products from the sphere of the reaction. The internal adsorption pressures of adsorbents such as activated charcoal are extremely high and the present invention which has wide application to many chemical reactions takes advantage of this adsorption pressure by effecting these chemical reactions in the adsorbent phase of the adsorbents.

The foregoing description of the oxidation reactions is intended to illustrate and explain the process of the invention clearly and to describe the apparatus in which the process is carried out. This description is not intended to limit the present invention to a particular chemical reaction or process as shown since the application of adsorption pressures to many gas or vapor phase oxidation reactions has been shown to be of advantage.

It should be emphasized that we do not wish to be limited by the particular compounds or methods of operation mentioned inasmuch as our invention includes and defines the broad principle of utilizing the extremely high internal adsorption pressures of granular solid adsorbents such as activated charcoal and activated charcoal or other adsorbents containing catalytic agents suitable for aiding oxidation reactions. By utilizing these internal pressures we are able to eliminate the necessity of compressing the reactants to superatmospheric pressures which in many processes must be at least as high as 1000 pounds per square inch. Such elevated pressures increase both the difficulty and cost of any operation and complexity and cost of equipment and their elimination represents the major advantage of our process. Further by reacting according to the present invention the only catalyst regeneration required is a simple steam stripping of the product from the catalyst itself. By employing temperatures below the point at which carbon to carbon bond rupture is initiated, build up of a carbon deposit on the surface of the catalyst is avoided. For this reason a high temperature burn off with air which normally prevents the usage of charcoal base catalysts is unnecessary.

Further, the disclosure of activated charcoal, the preferred adsorbent, is not to be considered as limiting this invention since the principles of this process may be applied using other adsorptive materials.

The inventors are well aware that charcoal catalysts have been disclosed in the prior art for the alkylation of olefins and isoparaffins and for catalyzing other reactions, but in none of this art is there any disclosure of the novel two-step reactant adsorption principles of the present invention. These characoal catalysts have been employed in high temeprature-high pressure reaction systems wherein a mixed reactant feed has been passed over the catalyst under applied pressures and subsequently the product is fractionated to obtain the desired reaction products therefrom. It is apparent from the foregoing disclosure that the process of this invention is widely different from the art embodying as it does a different principal of physical laws and different methods of operation.

This application is a continuation-in-part of our copending application, Serial No. 71,826 filed January 21, 1949.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. In a chemical process for the oxidation of an oxidizable reactant by means of a vaporizable oxidizing agent wherein said reactant and said oxidizing agent are brought to reaction conditions of temperature and pressure and brought into contact for a sufficient time to effect a substantial degree of oxidation of said reactant and produce oxidation products through oxidation reactions which are favorably affected by the application of pressure, the improvement therein of subjecting the reactants and the oxidation reaction to the effect of an elevated pressure without externally applying pressure to the reactants which comprises passing downwardly through at least one contacting zone a moving bed of solid granular adsorbent which is impregnated with a catalytic material favorably affecting the rate of said oxidation reaction, adsorbing the less readily adsorbable reactant in the absence of other adsorbed reactants on said solid granular adsorbent thereby subjecting the adsorbed reactant alone to the superatmospheric adsorbed phase pressures, then in the absence of any substantial amounts of other reactants in the gas phase contacting the thus treated adsorbent with the more readily adsorbable reactant alone which is preferentially adsorbable by the adsorbent thereby bringing the two reactants together in the adsorbed phase and effecting the oxidation of one reactant by the other forming an oxidation product, and separating said product from said adsorbent.

2. In a chemical process for the oxidation of an adsorbable organic compound by reaction with an adsorbable oxidizing agent as reactants, wherein the reaction is favorably effected by the application of pressure, the reactants are brought to the desired reaction conditions of temperature and pressure, the reactants are mixed and allowed to react for a sufficient time to effect the desired degree of oxidation, and then the reaction product is treated to separate the desired oxidation products, the improvement in subjecting said reactants to the desired elevated pressure without external pressuring of the reactants which comprises passing a compact moving bed of solid granular adsorbent successively through zones of adsorption, reaction and stripping, which adsorbent is impregnated with a catalytic material favorably affecting the rate of the oxidation reaction, passing the less readily adsorbable first reactant through said adsorption zone forming a rich adsorbent containing adsorbed first reactant in the substantial absence of other adsorbed reactants, contacting the rich adsorbent in said reaction zone with the preferentially adsorbable second reactant in the substantial absence of other reactive materials in the gas phase thereby bringing said first and second reactants together under superatmospheric pressure and oxidation reaction temperature conditions in the adsorbed phase on the adsorbent thereby effecting at least a partial reaction between the reactants, subsequently stripping adsorbed constituents from the adsorbent in said stripping zone forming a lean adsorbent, returning said lean adsorbent to said adsorption zone, and separating the reaction product from the stripped constituents.

3. In a chemical process for the oxidation of an adsorbable organic compound by reaction with an adsorbable oxidizing agent as reactants, wherein the reaction is favorably effected by the application of pressure, the reactants are brought to the desired reaction conditions of temperature and pressure, the reactants are mixed and allowed to react for a sufficient time to effect the desired degree of oxidation, and then the reaction product is treated to separate the desired oxidation products, the improvement in subjecting said reactants to the desired elevated pressure without external pressuring of the reactants which comprises passing a compact moving bed of solid granular adsorbent successively through zones of adsorption, reaction, rectification and stripping, said solid granular adsorbent being impregnated with a catalytic material favorably affecting the rate of the oxidation reaction, passing the less readily adsorbable first reactant through said adsorption zone forming a rich adsorbent which is substantially free of other adsorbed reactants and contains adsorbed first reactant, contacting the rich adsorbent in said reaction zone with the preferentially adsorbable second reactant in the substantial absence of other reactants in the gas phase thereby bringing said first and second reactants together under superatmospheric pressure and oxidation reaction temperature conditions in the adsorbed phase on the adsorbent thereby effecting at least a partial reaction between the reactants, contacting the adsorbent in said rectification zone with a stream of preferentially adsorbable oxidation product as reflux thereby desorbing less readily adsorbable reactants therefrom forming a rectified adsorbent, returning said reactants to said reaction zone for further treatment, subsequently indirectly heating said rectified adsorbent in said stripping zone and stripping the adsorbed oxidation product therefrom, passing part of said product as reflux into said rectification zone, removing the remainder as product from the process, and returning the stripped adsorbent for repassage through said zones.

4. In a chemical oxidation process for the oxidation of a less readily adsorbable oxidizing reactant with a more readily adsorbable oxidizable reactant wherein the reaction is favorably effected by the application of pressure, the reactants are brought to the desired reaction conditions of temperature and pressure, the reactants are mixed and allowed to react for a sufficient time to effect the desired degree of oxidation, and then the reaction product is treated to separate the desired oxidation products, the improvement in subjecting said reactants to the desired elevated pressure without external pressuring of the reactants which comprises passing a compact moving bed of solid granular adsorbent successively through zones of adsorption, reaction and stripping, which adsorbent is impregnated with a catalytic material favorably affecting the rate of the oxidation reaction, passing the less readily adsorbable oxidizing reactant through said adsorption zone forming a rich adsorbent which is substantially free of other adsorbed reactants and contains the adsorbed oxidizing reactant, contacting the rich adsorbent in said reaction zone with the more readily adsorbable oxidizable reactant in the absence of any substantial amounts of other reactants in the gas phase thereby bringing said less readily and more readily adsorbable reactants together under superatmospheric pressure and oxidation temperature in the adsorbed phase on the adsorbent and effecting at least a partial reaction between the reactants, separating the oxidation product from the adsorbent in said stripping zone, and returning the lean adsorbent for repassage through said zones.

5. A method according to claim 4 wherein the less readily adsorbable oxidizing reactant comprises a gas containing ozone, the more readily adsorbable oxidizable reactant comprises ethylene, and the oxidation products contain formaldehyde and hydrogen peroxide.

6. A method according to claim 4 wherein the less readily adsorbable oxidizing reactant comprises a gas containing oxygen, the more readily adsorbable oxidizable reactant comprises an olefin hydrocarbon, and the oxidation product contains an olefin oxide.

7. A method according to claim 6 wherein said olefin hydrocarbon is ethylene, said oxidation product contains ethylene oxide, and said adsorbent is impregnated with a silver containing catalyst.

8. A method according to claim 7 wherein said ethylene oxide is desorbed from said adsorbent by indirect heating and steam stripping and is converted thereby into ethyl alcohol as said oxidation product.

9. A method according to claim 4 wherein said less readily adsorbable oxidizing reactant comprises a gas containing oxygen, said more readily adsorbable oxidizable reactant comprises methyl alcohol, and said oxidation product contains formaldehyde.

10. A method according to claim 9 wherein said adsorbent is impregnated with a methyl alcohol oxidation catalyst and the temperature of reaction is maintained below about 300° F.

11. In a chemical oxidation process for the oxidation of a less readily adsorbable oxidizable reactant with a more readily adsorbable oxidizing reactant wherein the reaction is favorably effected by the application of pressure, the reactants are brought to the desired reaction conditions of temperature and pressure, the reactants are mixed and allowed to react for a sufficient time to effect the desired degree of oxidation, and then the reaction product is treated to separate the desired oxidation products, the improvement in subjecting said reactants to the desired elevated pressure without external pressuring of the reactants which comprises passing a compact moving bed of solid granular adsorbent successively through zones of adsorption, reaction and stripping, which adsorbent is impregnated with a catalytic material favorably affecting the rate of the oxidation reaction, passing the less readily adsorbable oxidizable reactant through said adsorption zone forming a rich adsorbent containing adsorbed oxidizable reactant only and substantially no other adsorbed reactive materials, contacting the rich adsorbent in said reaction zone with the more readily adsorbable oxidizing reactant only and in the substantial absence of other added reactive gases thereby bringing said less readily and more readily adsorbable reactants together under superatmospheric pressure and oxidation temperature in the adsorbed phase on the adsorbent and effecting at least a partial reaction between the reactants, separating the oxidation product from the adsorbent in said stripping zone, and returning the lean adsorbent for repassage through said zones.

12. A process according to claim 11 wherein said less readily adsorbably oxidizable reactant adsorbed on said rich adsorbent comprises substantially pure nitrogen dioxide ($2NO_2 \rightleftharpoons N_2O_4$), said more readily adsorbable oxidizing reactant comprises steam, and said oxidation product comprises nitric acid.

13. A process according to claim 12 in combination with the steps of passing said rich adsorbent from said adsorption zone through an intermediate zone and then into said reaction zone, introducing a gas containing oxygen into said intermediate zone to react in the gas phase with nitric oxide (NO) liberated in said reaction zone to produce additional nitrogen dioxide, and passing the gas mixture containing said additional nitrogen dioxide into said adsorption zone for adsorption therein with said less readily adsorbable reactant introduced thereto.

14. A process according to claim 12 in combination with the step of maintaining the temperature of said reaction zone above about 230° F.

15. A process according to claim 11 wherein said less readily adsorbable oxidizable reactant comprises hydrogen sulfide, said more readily adsorbable oxidizing reactant comprises sulfur dioxide, said oxidation product comprises sulfur, and the temperature of said oxidation zone is maintained at a temperature of between about 200° F. and about 600° F.

16. A process according to claim 11 wherein said less readily adsorbable oxidizable reactant comprises a volatile hydrocarbon, the more readily adsorbable oxidizing reactant comprises a halogen, and the oxidation product comprises a halogenated hydrocarbon.

17. A process according to claim 16 wherein said hydrocarbon comprises ethane, said halogen is selected from the group consisting of fluorine, chlorine, and bromine, and the temperature of said oxidation zone is maintained between 250° F. and 800° F.

18. A process for continuous production of nitric acid which comprises contacting a downwardly moving bed of solid granular adsorbent with a gas containing nitrogen dioxide ($2NO_2 \rightleftharpoons N_2O_4$) whereby at least part thereof is adsorbed on said adsorbent in the substantial absence of other adsorbed reactive materials leaving any less readily adsorbable constituents unadsorbed, said adsorbent being impregnated with a catalytic material favorably affecting the rate of nitric acid production, subsequently contacting the thus treated adsorbent with a gas containing steam in the absence of other reactive gases whereby at least a part of said steam is adsorbed and reacts with adsorbed nitrogen dioxide forming nitric acid, and then stripping the nitric acid from the adsorbent.

19. A process for the oxidation and hydration of nitrogen dioxide which comprises contacting a gas containing nitrogen dioxide in an adsorption zone with a downwardly moving bed of solid granular adsorbent whereby the nitrogen dioxide alone is preferentially adsorbed leaving accompanying gases substantially unadsorbed, said adsorbent being impregnated with a catalytic material favorably affecting the rate of nitric acid production from nitrogen dioxide, passing the resulting adsorbent through a gas phase oxidation zone to a hydration zone, contacting said adsorbent in said hydration zone with steam alone at a temperature above 230° F. to form nitric acid and nitric oxide, passing said nitric oxide as a gas into said gas phase oxidation zone, introducing sufficient oxygen-containing gas into said gas phase oxidation zone to convert said nitric oxide to nitrogen dioxide in the gas phase, adsorbing the same on said adsorbent in said adsorption zone, and stripping said nitric acid from said adsorbent.

20. A process for continuous production of nitric acid which comprises contacting a downwardly moving bed of solid granular adsorbent in an adsorption zone with a gas containing nitrogen dioxide ($2NO_2 \rightleftharpoons N_2O_4$) whereby at least part thereof is adsorbed on said adsorbent in the substantial absence of other reactive adsorbed materials leaving any less readily adsorbable constituents unadsorbed, subsequently contacting the thus treated adsorbent in a reaction zone with a gas containing steam in the substantial absence of other reactive gases whereby said steam is adsorbed and reacts with adsorbed nitrogen dioxide forming nitric acid and nitric oxide, passing said nitric oxide into a gas phase oxidation zone introducing thereinto a gas containing oxygen into admixture with said nitric oxide whereby said nitric oxide is oxidized in the gas phase to form additional quantities of nitrogen dioxide which is then adsorbed on said adsorbent in said adsorption zone to be retreated with said steam in said reaction zone, and then stripping the nitric acid from the adsorbent in a stripping zone, said adsorbent being impregnated with a catalytic material favorably affecting the rate of nitric acid production.

21. A process for the continuous production of nitric acid which comprises passing a moving bed of solid granular adsorbent, impregnated with a catalytic material favorably affecting the rate of nitric acid production, downwardly by gravity through a nitrogen dioxide adsorption zone, a gas phase nitric oxide oxidation zone, a nitrogen dioxide hydration zone, and a nitric acid stripping zone, passing a gas containing nitrogen dioxide ($2NO_2 \rightleftharpoons N_2O_4$) through said adsorption zone forming a rich adsorbent containing adsorbed nitrogen dioxide and containing substantially no other adsorbed reactive materials, introducing a gas containing oxygen into said oxidation zone to convert nitric oxide passing therethrough from said hydration zone into nitrogen dioxide, passing said nitrogen dioxide into said adsorption zone wherein it is adsorbed forming further quantities of said rich adsorbent, contacting said rich adsorbent in said hydration zone with a gas containing steam substantially free of other reactive gases thereby converting the adsorbed nitrogen dioxide into nitric acid liberating gaseous nitric oxide which passes into said oxidation zone, stripping nitric acid from said adsorbent in said stripping zone, and returning the lean adsorbent thus formed to said adsorption zone to contact further quantities of said gas containing nitrogen dioxide.

References Cited in the file of this patent

UNITED STATES PATENTS

| | | |
|---|---|---|
| 1,433,969 | Noyes | Oct. 31, 1922 |
| 1,767,057 | Dotter | June 24, 1930 |
| 1,984,164 | Stock | Dec. 11, 1934 |
| 2,121,793 | Goshorn et al. | June 28, 1938 |
| 2,384,311 | Kearby | Sept. 4, 1945 |
| 2,394,887 | Berl | Feb. 12, 1946 |
| 2,519,874 | Berg | Aug. 22, 1950 |
| 2,568,396 | James | Sept. 18, 1951 |
| 2,578,674 | Daniels et al. | Dec. 18, 1951 |

FOREIGN PATENTS

| | | |
|---|---|---|
| 407,617 | Germany | Dec. 19, 1924 |
| 211,845 | Great Britain | Feb. 26, 1925 |
| 653,317 | Great Britain | May 16, 1951 |

OTHER REFERENCES

Almquist et al. "Ind. and Eng. Chem.," June 1925, vol. 17, No. 6, pages 599–603.